United States Patent Office 3,454,556
Patented July 8, 1969

3,454,556
6-ACYLAMINO-PENICILLANIC ACID AZIDES
Lee C. Cheney, Fayetteville, N.Y., and Yvon G. Perron, St. Lambert, Quebec, Canada, assignors to Bristol-Myers Company, New York, N.Y., a corporation of Delaware
No Drawing. Original application Nov. 20, 1963, Ser. No. 325,138, now Patent No. 3,311,609, dated Mar. 28, 1967. Divided and this application Jan. 30, 1967, Ser. No. 612,309
Int. Cl. C07d 91/42, 99/14; A61k 21/00
U.S. Cl. 260—239.1                 13 Claims

ABSTRACT OF THE DISCLOSURE 6-substituted-penicillanic acid azides are useful intermediates in the preparation of 6-substituted-penicillanyl carbamates, a new class of compounds that are smooth muscle-relaxants. In one of several processes, benzylpenicillin triethylammonium salt in tetrahydrofuran was treated with ethylchloroformate to produce the benzylpenicillanic acid mixed anhydride. A solution of sodium azide was added to the "in situ" mixed anhydride to produce benzylpenicillanic acid azide. The acid azide is subsequently reduced to the penicillanyl alcohol which is further condensed with an isocyanate to produce a penicillanyl carbamate.

Cross-references to related applications

This application is a division of our co-pending application Ser. No. 325,138, filed Nov. 20, 1963 and issued Mar. 28, 1967 as United States Patent 3,311,609.

Background of the invention

Field of the invention.—This invention relates to chemical compounds useful, for example, as intermediates in the preparation of smooth muscle-relaxants and, more particularly to 6-substituted-penicillanic acid azides which are valuable intermediates in the ultimate preparation of 6-substituted-penicillanyl carbamates, a new class of smooth muscle-relaxants.

Description of the prior art.—The 6-substituted-penicillanic acid azides of the instant invention and their usefulness as intermediates in the preparation of the corresponding penicillanyl alcohols by a borohydride reduction were heretofore unknown in the art.

Summary of the invention

The 6-substituted-penicillanic acid azides of the present invention are compounds having the formula

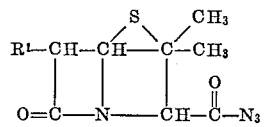

wherein R¹ is amino, acylamino, benzyloxycarbonylamino, phthalimido or tritylamino.

The preferred series of compounds is that of the formula

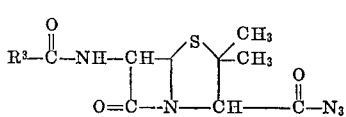

in which R³ represents the side chain of any of the penicillins.

Disclosure

This invention relates to novel acid azide intermediates which are useful in the preparation of smooth muscle relaxants and, more particularly, to 6-substituted-penicillanic acid azide intermediates which are useful in the preparation of 6-substituted-penicillanyl carbamates.

There is thus provided, according to the present invention the series of compounds having the formula

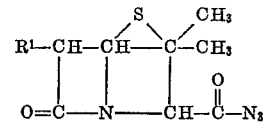

wherein R¹ is amino, acylamino, benzyloxycarbonylamino, phthalimido or tritylamino.

The preferred series of compounds is that of the formula in which R³ represents the side chain of any of the known penicillins other than those containing a group which is altered by reaction with sodium borohydride such as a ketonic carbonyl. It is this series which may be named 6-(substituted formamido)penicillanic acid azides.

Other known penicillins include those disclosed in U.S. Patents 2,941,995; 2,951,839; 2,996,501; 3,007,920; 3,025,290; 3,035,047; 3,040,032; 3,040,033; 3,041,332; 3,041,333; 3,043,831; 3,053,831; 3,071,575; 3,071,576; 3,082,204; 3,093,547 and 3,093,633 and in British patent specifications 874,414; 874,416; 876,516; 876,662; 877,120; 877,531 878,233; 880,042; 880,400; 882,335; 888,110; 888,552; 889,066; 889,069; 889,070; 889,168; 889,231; 890,201; 891,279; 891,586; 891,938; 893,518; 894,247; 894,460; 896,072; 899,199; 900,666; 905,778; 906,383; 908,787; 914,419; 916,097; 916,204; 916,488; 920,176; 920,177; 920,300; 921,513; 922,278; 924,037 and 925,281 and in Belgian Patents 593,222; 595,171; 597,859; 602,-494; 603,703; 609,039; 616,419 and 617,187 and in South African patent applications 60/2882; 60/3057; 60/3748; 61/1649; R61/2751; 62/54; 62/4920; 63/1612 and 63/2423.

Preferred compounds of the present invention are those of the formulae

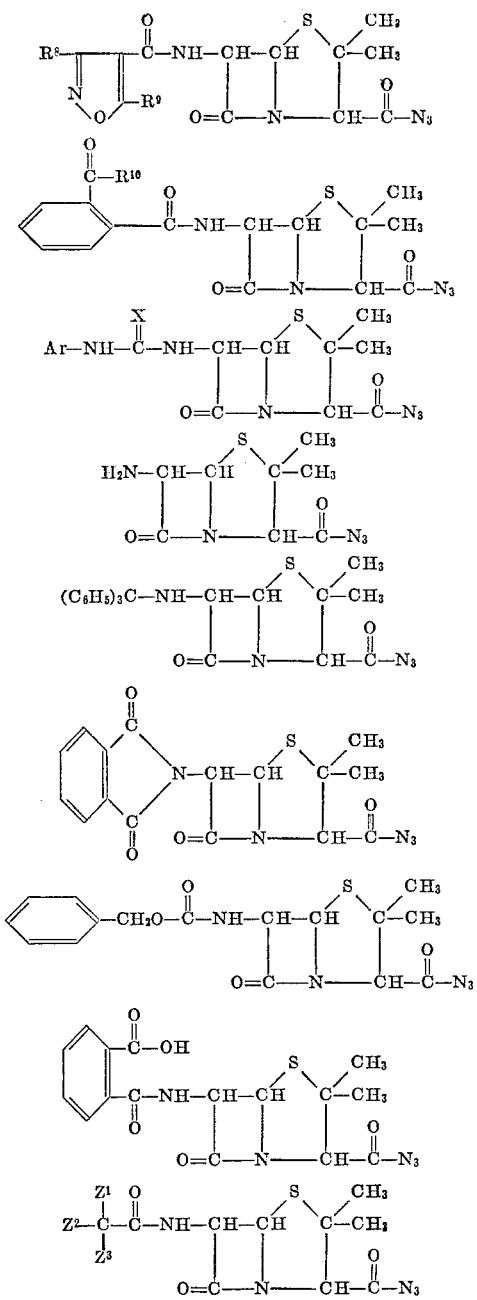

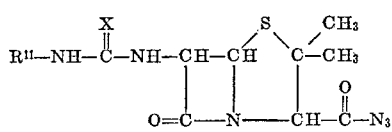

and wherein R⁴ represents hydrogen, amino, carbobenzoxyamino, phenyl, fluoro, chloro, bromo, iodo, hydroxy, or (lower)alkanoyloxy including especially acetoxy or (lower)alkoxy; X represents oxygen or sulfur; R⁵ and R⁶ each represent hydrogen, phenyl, or (lower)alkyl; R⁷ represents (lower)alkyl; R⁸ and R⁹ each represent (lower)alkyl, or Ar and at least one of R⁸ and R⁹ represents (lower)alkyl; R¹⁰ represents (lower)alkylamino, di(lower)alkylamino, cycloalkylamino having from 3 to 7 carbon atoms inclusive, allylamino, diallylamino, phenyl(lower)alkylamino, morpholino, lower(alky)morpholino, di-(lower)alkylmorpholino, morpholino(lower)alkylamino, pyrrolidino, (lower)alkylpyrrolidino, di(lower)alkylpyrrolidino, N,N-hexamethyleneimino, piperidino, lower(alkyl)piperidino, di(lower)aklylpiperidino, 1,2,5,6-tetrahydropyridino, N-(lower)alkylpiperazino, N-phenyl-piperzino, N-(lower)alkyl(lower)alkylpiperazino, N-(lower)alkyl-di-(lower)alkylpiperazino, furfurylamino, tetrahydrofurfurylamino, N-(lower)alkyl-N-furfurylamino, N-alkyl-N-anilino or (lower)alkoxy-anilino; Z¹, Z² and Z³ each represent a member selected from the group consisting of (lower)alkyl and the monovalent radical of the formula.

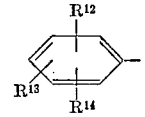

wherein R¹², R¹³ and R¹⁴ are each hydrogen, chloro, bromo, iodo, trifluoromethyl, nitro, (lower)alkyl or (lower)alkoxy; R¹¹ represents (lower)alkyl, (lower)cycloalkyl, naphthyl, benzyl or phenethyl; and Ar represents the monovalent radical of the formula

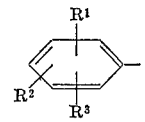

wherein R¹, R² and R³ are each a member selected from the group consisting of hydrogen, chloro, bromo, iodo, trifluoromethyl, phenyl, (lower)alkyl and (lower)alkoxy, but only one R group may represent phenyl.

The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with "(lower)alkyl."

Preferred embodiments of the present invention are the restricted series of compounds of the following formula.

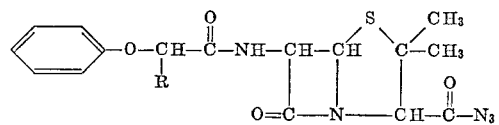

wherein R represents (lower)alkyl;

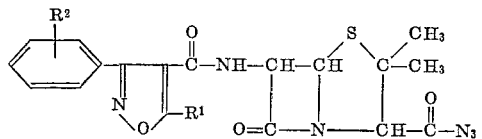

wherein R¹ represents (lower)alkyl and R² is hydrogen or chloro;

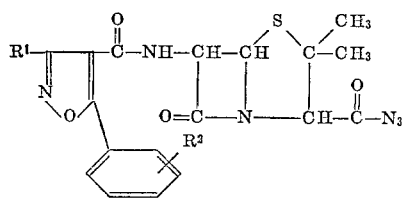

wherein R¹ is (lower)alkyl and R² is hydrogen or chloro;

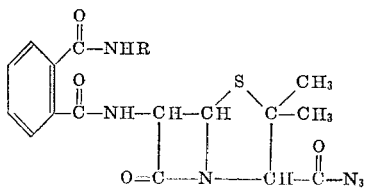

wherein R represents (lower)alkyl;

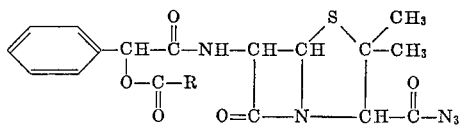

wherein R is (lower)alkyl; and

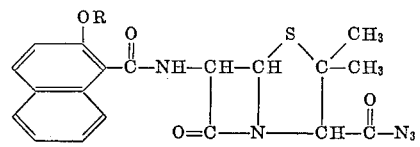

wherein R is (lower)alkyl; and the individual compounds of the following formulae

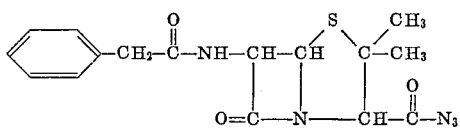

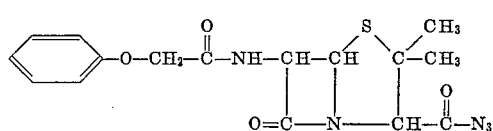

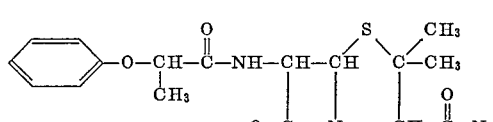

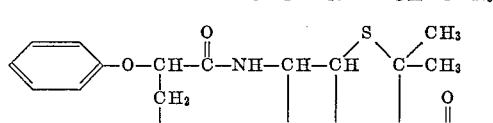

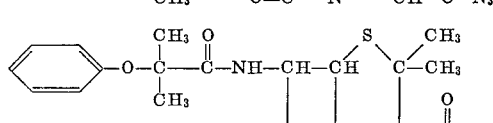

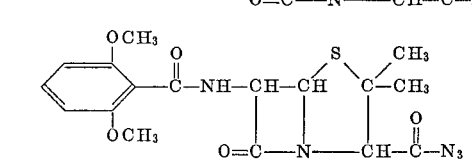

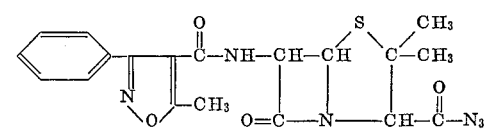

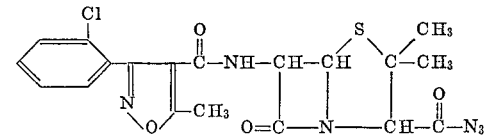

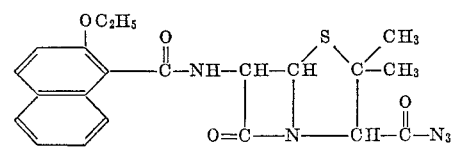

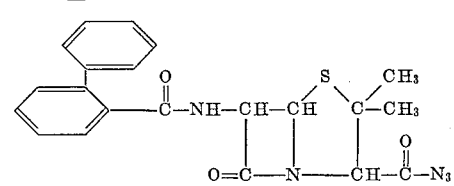

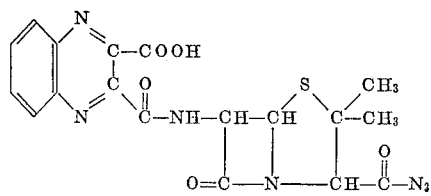

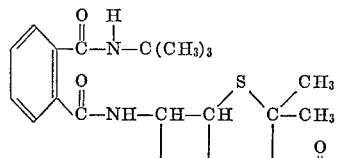

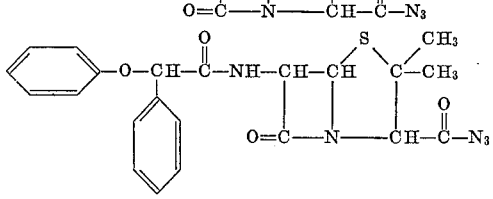

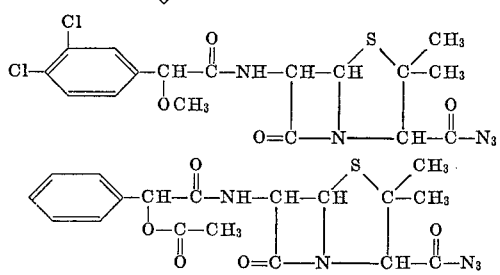

A preferred starting material used in the process of the present invention is a mixed anhydride of a penicillin with another carboxylic acid, including a monoester, and particularly a lower aliphatic ester, of carbonic acid. Treatment of the mixed anhydride with an inorganic azide, e.g., sodium azide, yields the penicillin acid azide which is then converted to the desired penicillanyl alcohol by reaction with an alkali metal borohydride, e.g., sodium borohydride. Alternatively, the penicillin mixed anhydride is reacted directly with such a borohydride to produce the same penicillanyl alcohol.

One method which may be used to obtain the compounds of the present invention involves as its first step, the reaction of an inorganic azide such as sodium azide with a mixed anhydride of the penicillin. The production of mixed anhydrides of carboxylic acids is known. Briefly, the acid is treated with enough base, such as triethylamine, to form the salt and then with a reagent such as an alkyl chlorocarbonate or an organo sulfonyl chloride to form the mixed anhydride. The following equations exemplify this reaction:

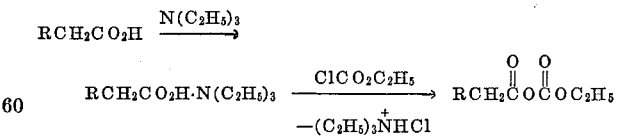

In preparing a mixed anhydride of a penicillin, a salt of the penicillin, such as the potassium, sodium or triethylamine salt, is reacted with a reagent such as an alkyl halocarbonate, (e.g., ethyl chloroformate) or an organo (preferably alkyl or aryl)sulfonyl chloride, (e.g. p-toluenesulfonyl chloride or methanesulfonyl chloride). The reaction may be represented as follows:

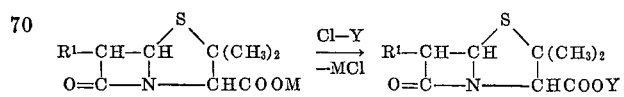

wherein $R^1$ is as previously described; M is a cation such as potassium, sodium or the triethylamino radical; and Y represents an alkyl carbonate or an organo (preferably alkyl or aryl)-sulfonyl group—i.e., Y may be, for example, —COOCH₂CH₃,

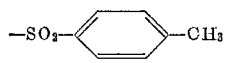

or —SO₂CH₃. The reaction is preferably conducted in the presence of a non-reactive solvent such as methylene chloride. The reaction conditions may vary widely and are not critical. Thus, the temperature may range from about —30° C. up to the reflux temperature of the solution. The proportions may also be varied widely. It is preferred to use from one to two moles of the anhydride forming reagent per mole of penicillin salt.

After the mixed anhydride of the penicillin has been prepared, it is reacted with an inorganic azide such as sodium azide. The reaction may be conducted in the presence of a solvent such as tetrahydrofuran and the azide is preferably added in aqueous solution. The temperature at which the reaction is conducted may vary between about —40° C. and room temperature. The proportions of reactants may also be varied widely. It is preferred that from about one-half to two moles (and usually about one mole) of azide per mole of the penicillin mixed anhydride be used. After the reaction with a borohydride is complete, pure penicillanyl alcohol may be recovered by removal of the solvent and recrystallization of the product.

One equivalent of the alcohols resulting from the borohydride treatment of the penicillanic acid azide is further treated with from one to three equivalents of phenylisocyanate to produce the ultimate product desired, a muscle-relaxing 6-(substituted formamido)penicillanyl-carbamate having the general formula

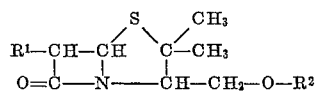

wherein R¹ is amino, acylamino, benzyloxycarbonyl-amino, phthalimido or tritylamino and R² is arylcarbamoyl (—CO—NH—Ar) and especially phenylcarbamoyl. Use of a non-hydroxylic solvent such as methylene chloride, benzene or dimethylformamide is preferred; the reaction proceeds more quickly at elevated temperatures, e.g. at the reflux temperature of the solvent, but can be conducted at room temperature.

Each of the penicillin alcohols described above is prepared from the corresponding acid azide as set forth above in general and as exemplified in detail in the examples below. Thus these acid azides have the grouping

in place of the —CH₂OH group of the corresponding penicillin alcohol. For purposes of additional chemical identification, analysis and the like it is desirable to convert these acid azides to the corresponding isocyanates having the substituent —NCO in place of the

group; this transformation is easily performed by heating the azide mildly or by placing it in a vacuum, e.g. for several days at room temperature. These isocyanates, which may be named 6-substituted amido-2,2-dimethyl-3-penamyl isocyanates, are also reactive intermediates for further chemical transformations.

The following examples will serve to illustrate the invention, which is not limited thereto. All temperatures are given in degrees centigrade.

Description of the preferred embodiments

Example 1

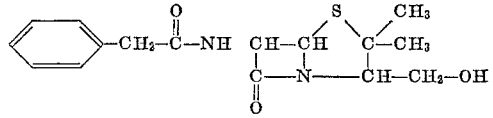

6-phenylacetamidopenicillanyl alcohol.—A suspension of 43.5 g. (0.10 mole) of benzylpenicillin triethyl-ammonium salt in 300 ml. of tetrahydrofuran was cooled to —10° and a solution of 10.8 g. (0.10 mole) of ethyl chloroformate in 50 ml. of tetrahydrofuran was added. The resulting mixture was stirred at —10° for two hours, when the solution became clear. Then a solution of 6.5 g. (0.10 mole) of sodium azide in 50 ml. of water was added dropwise during a period of thirty minutes to form benzylpenicillin acid azide. The reaction mixture was diluted with 100 ml. of ice water, and 7.4 g. (0.20 mole) of sodium borohydride was added in small portions during the next thirty minutes to form the product, 6-phenyl-acetamidopenicillanyl alcohol. This stage of the reaction was carried out at 0–5°, and the pH was maintained in the range of 6 to 8 by occasional additions of glacial acetic acid. The solution was acidified to pH 6.0 with glacial acetic acid, diluted with 500 ml. of water and extracted with three 250 ml. portions of methylene chloride. The combined methylene chloride extracts containing the product were dried over anhydrous sodium sulfate, filtered and the solvent was removed by vacuum distillation at 33° to leave as the residue the product, which was prepared for analysis by solution in 300 ml. of dry ethyl acetate, filtration and complete removal of the solvent under vacuum to give 25 g. (78% yield). The infrared absorption spectrum included maxima for OH at 3280; β-lactam at 1770; amide at 1660 and 1530; primary alcohol at 1042; aromatic at 730 and 700 cm.⁻¹.

*Analysis.*—Calc'd for $C_{16}H_{20}N_2O_3S$: C, 59.99; H, 6.29; N, 8.75. Found: C, 59.65; H, 6.03; N, 8.63.

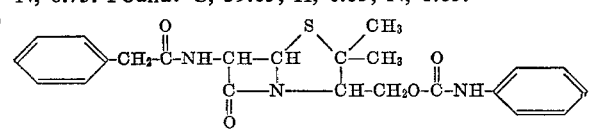

6-phenylacetamidopenicillanyl alcohol phenylcarbamate.—A solution containing 8.0 g. (0.025 mole) of 6-phenylacetamidopenicillanyl alcohol and 6.0 g. (0.050 mole) of phenylisocyanate in 50 ml. of methylene chloride was stirred at room temperature for one-half hour and then heated to reflux for five minutes. It was cooled, filtered, and diluted to the cloud point with petroleum ether (Skellysolve B, boiling point 40°–60°). On standing for fifteen hours, 11 g. (100%) of the crude, crystalline product, 6-phenylacetamidopenicillanyl alcohol phenylcarbamate, was collected by filtration. It was recrystallized from 250 ml. of isopropyl alcohol to give 10.0 g. (90%) of purified product, M.P. 129°–130°. The infrared spectrum of this material had characteristic absorption maxima for NH at 3270; β-lactam at 1785; carbamate at 1710; amide at 1660; and aromatic at 770 and 695 cm.⁻¹.

*Analysis.*—Calc'd for $C_{23}H_{25}N_3O_4S$: C, 62.85; H, 5.73; N, 9.58. Found: C, 62.50; H, 5.57; N, 9.68.

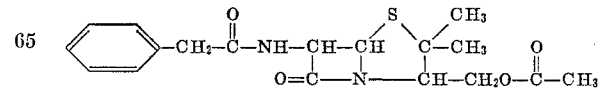

6-phenylacetamidopenicillanyl acetate.—A solution of 1.531 g. (4.77 millimoles) of 6-phenylacetamidopenicillanyl alcohol in 20 ml. of acetic anhydride was heated on a steam bath for thirty minutes. The excess acetic anhydride was removed by vacuum codistillation with benzene at 50°. The residue was vacuum-dried over phosphorus pentoxide to yield the product, 6-phenylacetamidopenicillanyl acetate, as 1.734 g. (100%) of stiff gum. The product was dissolved in 150 ml. of ether and extracted with two 100 ml. portions of 9% sodium bicarbonate solution, washed with water, dried over sodium sulfate and filtered. The purified product was precipitated from the filtrate by dilution with pentane. The resulting gum, 640 mg., was dried to a fluff under vacuum. Its infrared absorption spectrum in chloroform showed maxima for NH at 3410; β-lactam at 1780; ester at 1740; amide at 1675; ester at 1215; and aromatic at 785 and 670 cm.$^{-1}$.

*Analysis.*—Calc'd for $C_{18}H_{22}N_2O_4S$: C, 59.93; H, 6.15; N, 7.77. Found: C, 59.40; H, 6.08; N, 7.90.

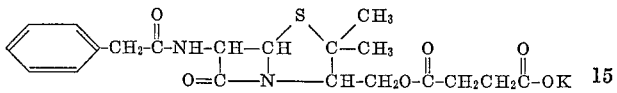

Potassium 6-phenylacetamidopenicillanyl alcohol acid succinate.—A mixture of 16.0 g. (0.050 mole) of 6-phenylacetamidopenicillanyl alcohol, 6.0 ml. of triethylamine, 5.0 g. (0.050 mole) of succinic anhydride, and 200 ml. of methylene chloride was stirred for one hour at room temperature and one hour at reflux. The solvent was removed under reduced pressure and the residue was dissolved in 500 ml. of 2.5% aqueous sodium bicarbonate. It was extracted with 300 ml. of ether (discarded) and the aqueous solution was cooled in an ice bath. To this cooled solution was added 400 ml. of methyl isobutyl ketone and sufficient 40% phosphoric acid to lower the pH to 2. The methyl isobutyl ketone extract was washed with water, dried briefly over sodium sulfate, filtered, and to it was added 25 ml. of 50% potassium 2-ethylhexanoate in n-butanol. The product, potassium 6-phenylacetamidopenicillanyl alcohol acid succinate, settled to the bottom as an oil which was dissolved in 400 ml. of dry acetone, from which it crystallized, 10.0 g., M.P. 149°–150° (dec.). The infrared absorption spectrum of this compound matched the expected structure, with maxima for NH at 3300; β-lactam at 1780; ester at 1725; amide at 1680; carboxylate at 1580; and aromatic at 700 cm.$^{-1}$.

*Analysis.*—Calc'd for $C_{20}H_{23}N_2O_6SK$: C, 52.40; H, 5.06; N, 6.12. Found: C, 52.40; H, 5.07; N, 6.27.

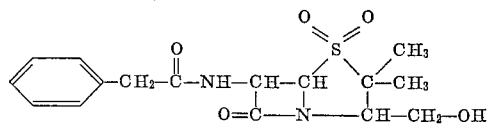

6-phenylacetamidopenicillanyl alcohol sulfone.—A solution containing 640 mg. (2.00 millimoles) of 6-phenylacetamidopenicillanyl alcohol in 15 ml. of acetone (which had been distilled from potassium permanganate) and 35 ml. of water was cooled to 5°. To this stirred solution was added dropwise a solution containing 632 mg. (4.00 millimoles) of potassium permanganate and 0.2 ml. of 85% phosphoric acid at such a rate that the temperature did not exceed 10°. The pH of the reaction mixture was kept in the range 6.5–7.5 by occasional addition of 20% sodium hydroxide solution. When the addition was completed, the mixture was stirred for twenty minutes at 5°–10° and the excess permanganate was then destroyed by addition of aqueous sodium bisulfite. The precipitated manganese dioxide was removed by filtration, and the pH of the filtrate was adjusted to 2 with 40% phosphoric acid. The solution was extracted twice with 50 ml. portions of methyl isobutyl ketone and the combined extracts were washed with cold water and dried over magnesium sulfate. On evaporation of the solvent, the product, 6-phenylacetamidopenicillanyl alcohol sulfone, remained as a gum which was redissolved in a few ml. of methyl isobutyl ketone and diluted with petroleum ether (Skellysolve B). The product precipitated a white, crystalline solid, 120 mg., M.P. 137°–139°. Recrystallization from ethyl acetate and Skellysolve B afforded an analytically pure sample, 45 mg., M.P. 139°–140°. Its infrared absorption spectrum exhibited the expected shift of the β-lactam to 1800, along with characteristic sulfone bands at 1320 and 1120 cm.$^{-1}$. Other bands found were OH and NH at 3400; amide at 1680 and 1520; and aromatic at 740 cm.$^{-1}$.

*Analysis.*—Calc'd for $C_{20}H_{23}N_2O_6S$: C, 54.54; H, 5.72; N, 7.45. Found: C, 54.80; H, 5.71; N, 8.05.

Example 2

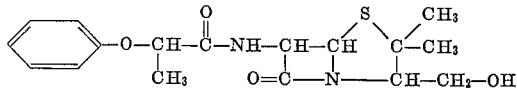

6(d,l-α-phenoxypropionamido) - penicillanyl alcohol.—A solution of 20.2 g. (0.05 mole) of potassium 6-(d,l-α-phenoxypropionamido)-penicillanate in 125 ml. of water was layered with ether, cooled, and acidified to pH 2 with 42% phosphoric acid. The ether layer was separated, washed with saturated NaCl solution, filtered through anhydrous Na$_2$SO$_4$ and treated with 7.0 ml. (0.05 mole) of triethylamine. The precipitated gum was dissolved by the addition of 150 ml. of methylene chloride and the solution was concentrated to an oil in vacuo at 30°. The oil was dissolved in 200 ml. of tetrahydrofuran and concentrated by removal of 90 ml. of solvent under reduced pressure. After the addition of 50 ml. of tetrahydrofuran, the stirred solution was cooled to −10° and 5.4 g. (0.05 mole) of ethyl chloroformate was added during 10 minutes. The mixture was stirred for one hour at −10° and treated during 15 minutes with a solution of 3.2 g. (0.05 mole) of sodium azide in 30 ml. of water. There was then added 3.8 g. (0.10 mole) of sodium borohydride in small portions during 20 minutes, the temperature being maintained at 0°. The pH was kept at 8–8.5 by occasional addition of glacial acetic acid. After dilution with 250 ml. of water, the reaction mixture was extracted three times with methylene chloride. The combined extracts were washed with water, dried over anhydrous Na$_2$SO$_4$ and concentrated in vacuo to give 12.0 g. of the product, 6-(d,l-α-phenoxypropionamido)-penicillanyl alcohol, as a pale yellow oil.

*Analysis.*—Calc'd for $C_{17}H_{22}N_2O_4S$: C, 58.3; H, 6.33; N, 8.00. Found: C, 57.7; H, 6.29; N, 8.20.

Infrared (KBr) (cm.$^{-1}$): 1685 (amide), 1785 (β-lactam).

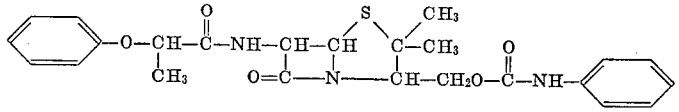

6-(d,l-α-phenoxypropionamido) - penicillanyl alcohol phenylcarbamate.—A solution of 3.0 g. (8.5 millimole) of 6-(d,l-α-phenoxypropionamido)—penicillanyl alcohol in 25 ml. of dry benzene was treated with 1.1 ml. (10 millimole) of phenylisocyanate. After 7 days at room temperature the solution was concentrated and the residual amber gum was dissolved in ether, from which the product, 6-(d,l-α-phenoxypropionamido)-penicillanyl alcohol phenylcarbamate, crystallized on scratching. The white product was recrystallized from benzene and petroleum ether (Skellysolve B) to yield 1.05 g., M.P. 165°–168°. The infrared absorption spectrum was consistent with the expected structure, having maxima for NH at 3345; β-lactam at 1787; carbamate at 1739; amide at 1680; phenyl ether at 1225; aromatic bands at 1600, 760 and 695 cm.$^{-1}$.

*Analysis.*—Calc'd for $C_{24}H_{27}N_3O_5S$: C, 61.38; H, 5.80; N, 8.95. Found: C, 61.00; H, 5.63; N, 8.90.

Example 3

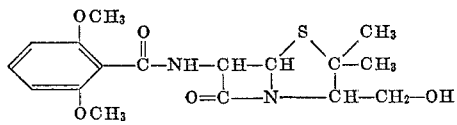

6-(2′,6′-dimethoxybenzamido)-penicillanyl alcohol.—A solution of 50 g. (0.119 mole) of sodium 6-(2,6-dimethoxybenazmido)-penicillanate monohydrate in 500 ml. of water was acidified with 42% phosphoric acid and extracted with 500 ml. of methylene chloride in two portions. The combined methylene chloride extracts were dried with sodium sulfate, filtered and the filtrate treated with 17 ml. (0.12 mole) of triethylamine. The solvent was removed at reduced pressure to give triethylammonium 6-(2,6-dimethoxybenzamido)-penicillanate as an oil.

To a solution of approximately 0.119 mole of triethylammonium 6-(2,6-dimethoxybenzamido)-penicillanate in 300 ml. of tetrahydrofuran at −10° was added dropwise 11.4 ml. (0.119 mole) of ethyl chloroformate over a period of ten minutes. After stirring for one hour at −10° a solution of 7.7 g. (0.118 mole) of sodium azide in 50 ml. of water was added dropwise over a period of 30 minutes at −10° to −12°. The reaction mixture was stirred for 15 minutes and 100 ml. of water was added, the temperature being maintained at 0° to 5°. The mixture was adjusted to pH 8.0 with 20% sodium hydroxide. Nine g. (0.238 mole) sodium borohydride was added in small portions over a period of one-half hour. The reaction mixture was maintained at pH 8.0 to 8.5 by the addition of either 20% sodium hydroxide or glacial acetic acid as needed. After stirring for one-half hour at 0° to 5° the reaction mixture was adjusted to pH 7 with 6 N hydrochyloric acid, diluted with 500 ml. of water and extracted with 500 ml. of methylene chloride. The methylene chloride extract was washed with 500 ml. of water, dried with sodium sulfate and filtered. The solvent was distilled at reduced pressure to give the product, 6-(2′, 6′-dimethoxybenzamido)-penicillanyl alcohol, as a viscous oil; yield 35 g.

A portion of the oil after approximately one week had partially crystalized. Ethyl acetate was added and the mixture stored for 2 hours at room temperature, then cooled in an ice bath and the crystalline product collected by filtration; M.P. 146°–148°.

*Analysis.*—Calc'd for $C_{17}H_{22}N_2O_5S$: C, 55.72; H, 6.05; N, 7.65. Found: C, 55.20; H, 5.93; N, 7.75.

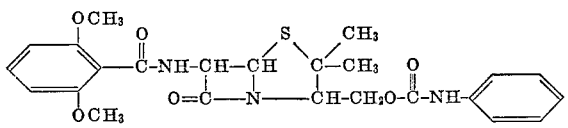

6-(2,6 - dimethoxybenzamido) - penicillanyl alcohol phenylcarbamate.—A solution of 3.7 g. (0.010 mole) of 6 - (2,6 - dimethoxybenzamido) - penicillanyl alcohol and 1.19 g. (0.010 mole) of phenylisocyanate in 25 ml. of methylene chloride was stored at room temperature for 20 hours. An additional 50 ml. of methylene chloride was added. Dilution with 150 ml. of petroleum ether (Skellysolve B) caused an oil to separate. The solvent was partially distilled at reduced pressure until about 25 ml. of solvent plus a semi-solid gum remained. The solvent was decanted and the gum ground with Skellysolve B to give the product, 6-(2,6-dimethoxybenzamido)-penicillanyl alcohol phenylcarbamate, as an amorphous solid which was collected by filtration and dried in vacuo over phosphorus pentoxide, 3.4 g. The infrared absorption spectrum had typical maxima for NH at 3300; β-lactam at 1780; urethane at 1740; amide at 1670; and aromatic at 705 cm.$^{-1}$.

*Analysis.*—Calc'd. for $C_{24}H_{27}N_3O_6S$: C, 59.36; H, 5.61; N, 8.65. Found: C, 59.50; H, 6.02; N, 8.07.

Example 4

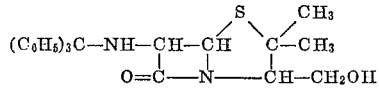

6-triphenylmethylaminopenicillanyl alcohol. — A suspension of 4.97 g. (0.0100 mole) of potassium 6-(triphenylmethylamino)-penicillanate in 40 ml. of water was acidified to pH 2.7 with 6 N sulfuric acid and extracted with two 200 ml. portions of ether. The combined ether extracts were washed once with 50 ml. of saturated sodium chloride solution, dried briefly over sodium sulfate, and filtered. The filtrate was treated with 2.5 ml. of triethylamine and flashed to dryness at 33°. The residue was flashed at 33° twice with 250 ml. portions of ethyl acetate to remove moisture azeotropically. The gummy residue was then dried to a fluffy solid by pumping at 1 mm. over phosphorus pentoxide for fifteen minutes. The fluffy solid was dissolved in 40 ml. of dry tetrahydrofuran in a 250 ml. flask protected with a calcium chloride tube, and cooled to −10° in ice-salt. The solution was treated with 0.85 ml. (0.009 mole) of ethyl chloroformate and stirred at −10° for 25 minutes. A solution of 0.58 g. of sodium azide (0.0089 mole) in 3 ml. of water was added dropwise during 20 minutes, followed immediately by 15 ml. of ice water. Solid sodium borohydride, 0.66 g. (0.0175 mole) was added during 28 minutes while the pH was held at 8.3–8.5 by the addition of glacial acetic acid.

The solution was diluted with 50 ml. of water, pH adjusted to 6.0 with acetic acid, and extracted with two 200 ml. portions of methylene chloride. The combined extracts were flashed to remove the solvent at 33° and the residue, which contained acetic caid, was dissolved in 150 ml. of ether. The ether solution was extracted with 50 ml. of 5% sodium bicarbonate solution, dried, filtered, and flashed dry, leaving a crystalline residue of the product, 6-triphenylmethylaminopenicillanyl alcohol, which was triturated with Skellysolve B, collected by filtration and dried. The yield was 1.60 g. of white crystals, M.P. 155°–170°. It was recrystallized from ether and Skellysolve B to a constant M.P. 187°–188°. Infrared and NMR spectra were in complete accord with the expected structure.

*Analysis.*—Calc'd. for $C_{27}H_{28}N_2O_2S \cdot \frac{1}{2} H_2O$: C, 71.49; H, 6.44; N, 6.18. Found: C, 71.75, 71.80; H, 6.38, 5.87; N, 6.15.

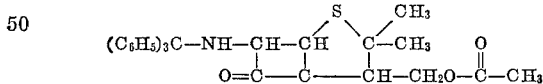

6-triphenylmethylaminopenicillanyl acetate. — A solution of 55 mg. of 6-triphenylmethylaminopenicillanyl alcohol in 1.0 ml. of acetic anhydride was heated on a steam bath for one hour. The solvent was removed under vacuum at 70° and the residual gum was flashed repeatedly with benzene to remove traces of acetic acid and acetic anhydride. It was extracted into 15 ml. of hot Skellysolve B, cooled and decanted from a trace of insoluble material. Complete removal of solvent under vacuum left 58 mg. (97%) of the product, 6-triphenylmethylaminopenicillanyl acetate, as a fluffy, non-crystalline solid. Its infrared absorption spectrum showed β-lactam at 1780; ester at 1745; aliphatic ester at 1230; and aromatic bands at 1600, 1490, 770, 750 and 710 cm.$^{-1}$.

*Analysis.* Calc'd. for $C_{29}H_{30}N_2O_3S$: C, 71.57; H, 6.21. Found: C, 71.50; H, 6.47.

Example 5

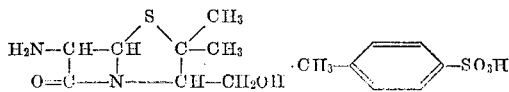

6 - aminopenicillanyl alcohol, p - toluenesulfonic acid salt.—A solution of 0.75 g. (1.68 millimole) of 6-triphenylmethylaminopenicillanyl alcohol in 10 ml. of dry acetone was stirred with 0.32 g. (1.68 millimole) of p-toluenesulfonic acid monohydrate for 30 minutes at 25°. The solvent was blown off with a stream of nitrogen and the gummy residue was triturated with 100 ml. of dry ether, which washed out the triphenylcarbinol (obtained from the ether solution in 81% purified yield and identified by melting point and infrared spectrum) and left the product, 6-aminopenicillanyl alcohol, p-toluenesulfonic acid salt, as a filterable solid. The crude yield of non-crystalline material was 0.63 g. It was reprecipitated five times from dry acetone by the addition of dry ether, 0.28 g. (amorphous), M.P. ca. 100°. Its infrared spectrum (in KBr) showed OH and NH absorption at 2.92–2.96μ, an intense β-lactam carbonyl at 5.61μ, and sharp, intense bands at 8.3, 8.9, 9.65, 9.9, 12.25 and 14.6μ characteristic of the toluenesulfonic acid.

*Analysis.*—Calc'd. for $C_{15}H_{22}N_2O_5S_2$: C, 48.11; H, 5.92. Found: C, 48.40; H, 5.83.

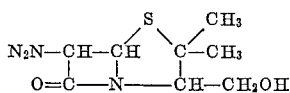

6 - aminopenicillanyl alcohol.—6 - aminopenicillanyl alcohol p-toluenesulfonic acid salt, 1.028 g. (2.72 millimoles), was added to a mixture of 5.12 ml. of water, 228 mg. of sodium bicarbonate, and 51 ml. of ethyl acetate. The resulting mixture was shaken vigorously and the ethyl acetate solution was separated. The aqueous layer was extracted twice more with 50 ml. portions of ethyl acetate. The combined ethyl acetate extracts were dried over sodium sulfate, filtered, and flashed to dryness at 30°. The residue was dissolved in 50 ml. of ethyl acetate adn precipitated by the addition of 600 ml. of n-pentane. The resulting solid, 6-aminopenicillanyl alcohol, weighed 278 mg. and had M.P. 86.5°–88.0°. Its infrared spectrum (in KBr) showed absorption maxima at 2.95–3.01μ (OH and NH), 3.37μ (C-H, with shoulders at 3.40 and 3.48μ) and 5.63μ (β-lactam). The characteristic toluenesulfonic acid absorptions above 8μ were absent.

Example 6

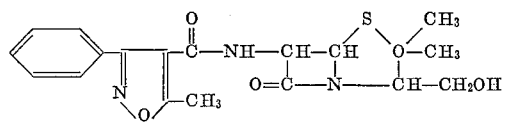

6 - ( - methyl - 3 - phenylisoxazole - 4 - carboxamido)-penicillanyl alcohol.—A solution of 9.1 g. (0.085 mole) of ethyl chloroformate in 40 ml. of tetrahydrofuran was added during 20 minutes to a stirred suspension of 44.3 g. (0.085 mole) triethylammonium 6-(5-methyl-3-phenylisoxazole-4-carboxamido)-penicillanate in 300 ml. of tetrahydrofuran, the temperature being maintained at −10°. The mixture was stirred for 2 hours at −10° and a solution of 5.5 g. (0.085 mole) of sodium azide in 50 ml. of water was added during 25 minutes while keeping the temperature at 0°–5°. After the addition of 100 ml. of water, 6.4 g. (0.17 mole) of sodium borohydride was added in small portions during 25 minutes, the pH being kept at 8–8.5 by occasional additional of glacial acetic acid. The pH was then lowered to 6 with glacial acetic acid, the mixture was diluted with 500 ml. of water and three extractions were made with methylene chloride. The combined extracts were dried for 30 minutes over anhydrous $Na_2SO_4$, filtered and concentrated in vacuo. An infrared curve indicated the presence of acidic material in this gum; it was therefore dissolved in ether, washed twice with saturated $NaHCO_3$ solution, twice with water and once with saturated NaCl solution. After drying over anhydrous $Na_2SO_4$, the solution was concentrated to yield the product as a tacky gum. After drying in vacuo for 15 hours, the product, 6-(5-methyl-3-phenylisoxazole-4-carboxamido) - penicillanyl alcohol, was obtained as a yellowish solid; yield 19.2 g. A sample of the solid crystallized from ether; M.P. 122°–123.5°. After recrystallization from benzene-Skellysolve B, it had M.P. 123°–124°.

*Analysis.*—Calc'd. for $C_{19}H_{21}N_3O_4S$: C, 58.9; H, 5.46; N, 10.9. Found: C, 58.8; H, 5.38; N, 10.8.

An infrared absorption spectrum (KBr) showed characteristic absorption maxima at 1785 (β-lactam) and 1675 (amide) cm.$^{-1}$.

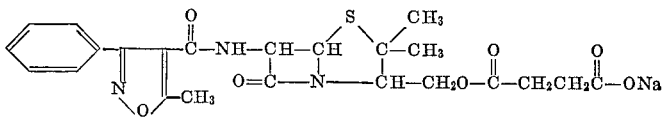

Sodium 6 - (5 - methyl - 3 - phenylisoxazole - 4 - carboxamido)-penicillanyl alcohol acid succinate.—A solution of 4.0 g. (0.010 mole) of 6-(5-methyl-3-phenylisoxazole-4-carboxamido)-penicillanyl alcohol, 1.0 g. (0.010 mole) of succinic anhydride, and fifteen drops of triethylamine in 50 ml. of methylene chloride was refluxed for 30 minutes and then evaporated in vacuo. The residue was dissolved in 75 ml. of methyl isobutyl ketone and extracted twice with 30 ml. portions of 5% sodium bicarbonate solution. The combined extracts were washed with ether (30 ml.), acidified to pH 2 with 20% sulfuric acid and extracted twice with 35 ml. portions of ether. The combined ethereal extracts were washed twice with 10 ml. portions of water, dried over sodium sulfate, filtered, and treated with 3.5 ml. (0.01 mole) of a 50% solution of sodium 2-ethylhexanoate in n-butanol. The product, sodium 6 - (5 - methyl - 3 - phenylisoxazole - 4 - carboxamido)-penicillanyl alcohol acid succinate, crystallized on standing at 8° for 17 hours. It was collected and dried in vacuo over phosphorus pentoxide; weight, 1.5 g.; M.P. 196°–198° (dec.). The infrared absorption spectrum contained maxima for NH at 3350; β-lactam at 1780; ester at 1730; amide at 1670; carboxylate at 1590; primary ester at 1160; aromatic at 1570 and 705 cm.$^{-1}$.

*Analysis.*—Calc'd. for $C_{23}H_{24}N_3O_7SNa \cdot \frac{1}{2}H_2O$: C, 53.27; H, 4.86; N, 8.10. Found: C, 53.50; H, 4.72; N, 8.16.

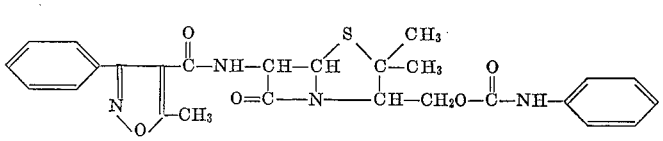

6 - (5 - methyl - 3 - phenylisoxazole-4-carboxamido)-penicillanyl alcohol phenylcarbamate.—A solution of 870 mg. (2.2 millimoles) of 6-(5-methyl-3-phenylisoxazole-4-carboxamido)-penicillanyl alcohol and 330 mg. (3.0 millimoles) of phenyl isocyanate in 20 ml. of dimethylformamide was allowed to stand at 25° for ten days. It was diluted with 80 ml. of water and cooled. The crystalline solid was collected, dissolved in 75 ml. of ethyl acetate and concentrated to dryness in vacuo. The residue was redissolved in ethyl acetate, concentrated to a low volume and filtered to remove a small amount of crystalline product which was identified as carbanilide by M.P. and infrared spectrum. Dilution of the ethyl acetate solution with petroleum ether (Skellysolve B, B.P. 60°–68°) gave the product, 6-(5-methyl-3-phenylisoxazole-4-carboxamido)-penicillanyl alcohol phenylcarbamate, as a crystalline solid. This was dissolved in methylene chloride, filtered to remove a trace of insoluble material, concentrated to dryness in vacuo, and recrystallized in turn from ethyl acetate and benzene—Skellysolve B. After drying in vacuo over phosphorus pentoxide, the product weighed 300 mg. (33%) and had M.P. 151°–151.5°. The infrared spectrum showed absorptions for NH at 3280; β-lactam at 1785; carbamate at 1738; amide at 1670; and aromatic at 765 and 700 cm.⁻¹.

*Analysis.*—Calc'd. for $C_{26}H_{26}N_4O_5S$: C, 61.50; H, 5.16; N, 11.10. Found: C, 61.40, 61.80; H, 5.07, 4.89; N, 11.05.

Example 7

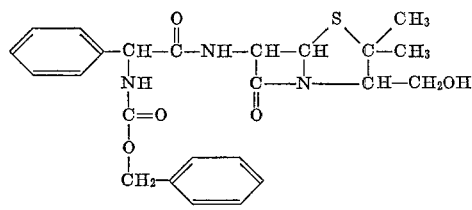

6 - (D-α-carbobenzoxyaminophenylacetamido)-penicillanyl alcohol.—A solution of 34 g. (0.070 mole) of 6 - (D - α-carbobenzoxyaminophenylacetamido)-penicillanic acid and 10 ml. (0.071 mole) of triethylamine in 300 ml. of tetrahydrofuran was cooled to —10° in an apparatus protected from atmospheric moisture by means of a calcium chloride drying tube and 7 ml. (0.070 mole) of ethyl chloroformate was added dropwise over a period of ten minutes. The mixture was stirred for one hour at —10° and then a solution of 4.6 g. (0.070 mole) of sodium azide in 50 ml. of water was added dropwise over a period of 30 minutes at —10° to —8°. After five minutes a solution of 19.2 g. (0.141 mole) of sodium acetate trihydrate in 100 ml. of water was added and the temperature was allowed to come to 0°. Over a period of one-half hour, 5.3 g. (0.141 mole) of sodium borohydride was added in small portions to the rapidly stirred mixture while the temperature was maintained at 0° to 5°. Vigorous gas evolution occurred after each addition. The mixture was maintained in the range of pH 7.5 to 8.1 by the addition of glacial acetic acid as needed. After the addition of sodium borohydride was complete, the reaction mixture was stirred for one-half hour at 0° to 5° and adjusted to pH 6.0 with 6 N hydrochloric acid. Water (500 ml.) was added and the mixture extracted with one 500 ml. portion of methylene chloride. The methylene chloride extract was washed with two 500 ml. portions of water, dried with sodium sulfate, filtered and the solvent removed at reduced pressure to give the product, 6 - (D - α-carbobenzoxyaminophenylacetamido)-penicillanyl alcohol, as a viscous oil; yield 33 g.

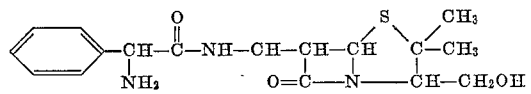

6-(D-α-aminophenylacetamido)-penicillanyl alcohol.— A solution of 9.00 g. (0.0192 mole) of 6-(D-α-carbobenzoxyaminophenylacetamido)-penicillanyl alcohol, 200 ml. of isopropyl alcohol, 25 ml. of water and 3 ml. of glacial acetic acid was hydrogenated on a Paar hydrogenation apparatus at an initial pressure of 50 p.s.i. for three hours in the presence of 10 g. of 30% palladium on diatomaceous earth. The catalyst was removed by filtration and most of the solvent was distilled from the filtrate at reduced pressure. Water (75 ml.) was added to the residue and the mixture was extracted with 150 ml. of methylene chloride. The aqueous phase which was found to be at pH 4.5 was adjuster to pH 7.5 with 20% sodium hydroxide and extracted with 50 ml. of methylene chloride. The methylene chloride extract was dried with sodium sulfate, filtered, and the solvent removed at reduced pressure to give 1.4 g. (16%) of product, 6-(D-α-aminophenylacetamido)-penicillanyl alcohol, as a viscous oil which soon solidified. The infrared absorption spectrum of this material in methylene chloride showed maxima for water at 3600; OH and NH at 3300; β-lactam at 1780; and amide at 1680 and 1520 cm.⁻¹.

*Analysis.*—Calc'd. for $C_{16}H_{21}N_3O_3S \cdot \frac{1}{2}H_2O$: C, 55.79; H, 6.44; N, 12.20. Found: C, 55.65, 55.50; H, 6.37, 6.42; N, 12.68.

Example 8

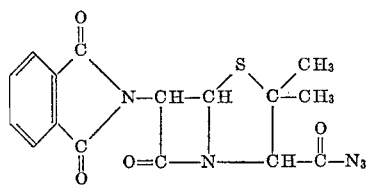

6-phthalimidopenicillanic acid azide.—A solution of 34.6 g. (0.10 mole) of 6-phthalimidopenicillanic acid and 14 ml. (0.1 mole) of triethylamine in 300 ml. of tetrahydrofuran was cooled to —10° and a solution of 10.8 g. (0.1 mole) of ethyl chloroformate in 50 ml. of tetrahydrofuran was added. The resulting mixture was stirred at —10° for one hour, and then a solution of 6.5 g. (0.10 mole) of sodium azide in 50 ml. of water was added during a period of 30 minutes. The reaction mixture was diluted with an equal volume of water and the crystalline azide thus formed was collected by filtration, yield 30 g. It was characterized by its infrared absorption spectrum which exhibited maxima for azide at 2164; phthalimide at 1825, 1725 and 1710; β-lactam at 1780; aromatic ring at 792 and 717 cm.⁻¹.

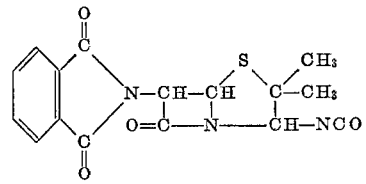

6 - phthalimido - 2,2-dimethyl-3-penamylisocyanate.— When 6-phthalimidopenicillanic acid azide was dried under vacuum for two days at room temperature, it was quantitatively converted to the corresponding crystalline isocyanate, m.p. 75° (dec.). It infrared absorption spectrum showed an intense isocyanate band at 2275; phthalimide at 1806 and 1733; β-lactam at 1797; and aromatic ring at 795 and 716 cm.⁻¹.

*Analysis.*—Calc'd. for $C_{16}H_{13}N_3O_4S$: C, 55.97; H. 3.79; N, 12.24. Found: C, 55.99, 55.64; H, 3.60, 3.63; N, 12.00, 12.29.

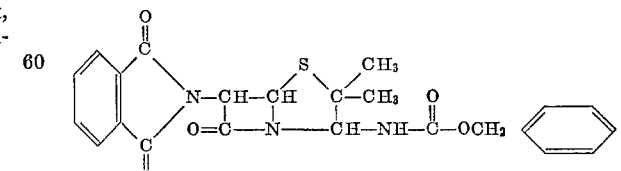

Benzyl - 2,2-dimethyl-6-phthalimido-3-penamyl carbamate.—A solution containing 18.5 g. (0.050 mole) of 6-phthalimidopenicillanic acid azide and 10.8 g. (0.10 mole) of benyl alcohol in 150 ml. of benzene was warmed to about 75° and stirred until evolution of nitrogen ceased. The reaction mixture was evaporated to dryness at reduced pressure and the crystalline residue of the product, benzyl - 2,2-dimethyl-6-phthalimido-3-penamyl carbamate, was recrystallized from acetone-water and then from isopropyl alcohol to a constant M.P. of 161°–

162°. The yield was 20.5 g. Its infrared absorption spectrum had bands ascribed to NH at 3400; β-lactam, phthalimide and urethane carbonyls in two rather broad absorptions centering at 1785 and 1720; and aromatic bands at 796 and 716 cm.$^{-1}$.

*Analysis.*—Calc'd. for $C_{23}H_{21}N_3O_5S$: C, 61.19; H, 4.65; N, 9.31. Found: C, 61.27; H, 4.86; N, 9.57.

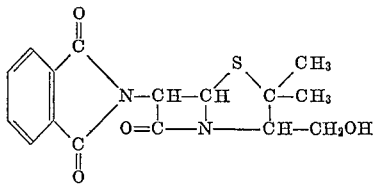

6-phthalimidopenicillanyl alcohol.—A solution containing 17.3 g. (0.050 mole) of 6-phthalimidopenicillanic acid and 7 ml. (0.05 mole) of triethylamine in 150 ml. of dry tetrahydrofuran was cooled to —10°. To the cooled and vigorously stirred solution was added a solution of 5.4 g. (0.050 mole) of ethyl chloroformate in 25 ml. of tetrahydrofuran. The resulting mixture was stirred for 1 hour at —10°. A solution of 3.25 g. (0.050 mole) of sodium azide in 25 ml. of water was then added dropwise during 30 minutes, the temperature being kept between —5° and —10°. Stirring was continued for a further 15 minutes, and the mixture was then diluted with 100 ml. of cold water. The acid azide which precipitated was collected by filtration, washed with cold water and dried briefly by suction on the water pump. It was then dissolved in a mixture of 300 ml. of dioxane and 50 ml. of water, and the solution was cooled to 5°. To the stirred solution was added 3.7 g. (0.10 mole) of sodium borohydride in portions so that the temperature was maintained at 5°. The pH of the solution was kept at 8.0–8.5 by suitable addition of glacial acetic acid. After the addition was completed, the mixture was stirred for 25 minutes at 5°, then diluted with 250 ml. of water and the pH adjusted to 6.5 by addition of more acetic acid. The acidic solution was extracted three times with 200 ml. portions of methylene chloride, and the combined extracts were washed successively with 5% aqueous sodium bicarbonate solution and with cold water. After the extracts were dried (anhydrous magnesium sulfate) the solvent was evaporated to leave a clear gum, which was dissolved in a mixture of ethyl acetate and anhydrous ether and the solvents removed at 30°/15 mm. The residue of the product, 6-phthalimidopenicillanyl alcohol, was then a glass-like solid which, on trituration with cold isopropyl alcohol, became crystalline. Yield 8.6 g. A small portion was recrystallized for analysis from isopropyl alcohol and gave white needles, M.P. 160°–162°. Its infrared absorption spectrum showed maxima for OH at 2.85; phthalimide at 1785 and 1720; β-lactam at 1760; primary alcohol at 1350, 1310 and 1045; aromatic at 793 and 720 cm.$^{-1}$. Its NMR spectrum showed all of the expected resonance lines, as well as the presence of isopropyl alcohol.

*Analysis.*—Calc'd. for $C_{16}H_{16}H_2O_4S \cdot \frac{1}{2}C_3H_8O$: C, 58.01; H, 5.56; N, 7.73. Found: C, 57.85; H, 6.02; N, 7.72.

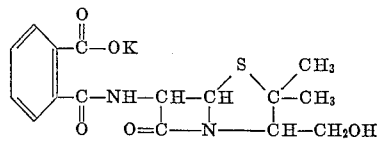

Potassium salt of 6-(2'-carboxybenzamido)-penicillanyl alcohol.—A solution of 10 g. (0.030 mole) of 6-phthalimidopenicillanyl alcohol in 200 ml. of tetrahydrofuran and 200 ml. of water was maintained at pH 10–11 by the constant addition of 1 N sodium hydroxide. When 29 ml. of base (0.029 mole) had been added, the solution was extracted with three 200 ml. portions of methylene chloride, the aqueous phase was acidified to pH 3 with 40% phosphoric acid and again extracted with two 200 ml. portions of methylene chloride. The combined extracts of the acidified solution were dried over sodium sulfate, filtered, and evaporated under reduced pressure. The residue of 6-(2'-carboxybenzamido)-penicillanyl alcohol was dissolved in 100 ml. of ethyl acetate and treated successively with three 0.0050 mole portions of potassium 2-ethylhexanoate, the crystalline precipitate which formed with each treatment being collected by filtration and dried. Infrared and NMR spectra showed the third fraction to be the pure potassium salt of 6-(2-carboxybenzamido)-penicillanyl alcohol, 1.8 g., with maxima for OH and NH at 3600 to 3000; β-lactam at 1770; amide at 1660; carboxylate at 1400; primary alcohol at 1310 and 1045; and 1,2-disubstituted benzene at 750 cm.$^{-1}$.

Example 9

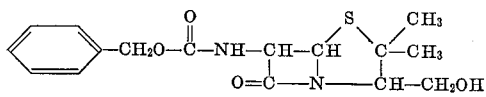

N-carbobenzoxy-6-aminopenicillanyl alcohol.—A suspension of 22.2 g. (0.05 mole) of N-carbobenzoxy-6-aminopenicillanic acid in the form of its triethylamine salt in 150 ml. of tetrahydrofuran was cooled to —10° in an ice-salt bath. To this cooled solution was added with stirring a solution of 5.4 g. (0.05 mole) of ethyl chloroformate in 25 ml. of tetrahydrofuran. The resulting mixture was stirred and cooled at —10° for 2 hours. At this point, a slurry remained although of visibly altered character. Then a solution of 3.25 g. of (0.05 mole) of sodium azide in 25 ml. water was added dropwise over a 30 minute period. The reaction mixture was then diluted with 50 ml. water containing 6.8 g. (0.05 mole) of sodium acetate trihydrate to bring the pH of the medium to 7.5. Then small portions of sodium borohydride totalling 3.7 g. (0.10 mole) were added over a 30-minute period during which time the temperature was maintained between 0° and 5° and the pH between 7.5 and 8.3 by occasional addition of glacial acetic acid. At the end of addition, the pH of the medium was brought to 6.0 with glacial acetic acid and then 250 ml. of water added. The mixture was extracted three times with 100 ml. portions of methylene chloride and the combined extracts containing the product, N-carbobenzoxy-6-aminopenicillanyl alcohol, were dried over magnesium sulfate overnight. After removal of solvent, a portion of the residue (14.0 g.) was examined by infrared and NMR spectroscopy. Both spectra were consistent with the product being N-carbobenzoxy-6-aminopenicillanyl alcohol contaminated by tetrahydrofuran. The residue was dried thoroughly under vacuum forming a foamy glass which resisted all attempts at crystallization.

*Analysis.*—Calc'd for $C_{16}H_{20}N_2O_4S$: C, 57.1; H, 6.0; N, 8.3. Found: C, 57.1; H, 5.8; N, 8.7, 8.6.

Example 10

6-phenylacetamidopenicillanyl alcohol.—A flame-dried 500 ml. three-neck round-bottom flask equipped with a stirrer, thermometer and pressure-compensated dropping funnel was charged with a suspension of 10.9 g. (0.025 mole) of benzylpenicillin triethylammonium salt in 75 ml. of dry tetrahydrofuran and placed under a nitrogen atmosphere. To the vigorously stirred suspension at —10° a solution of 2.7 g. (0.025 mole) of redistilled ethyl chloroformate in 15 ml. of dry tetrahydrofuran was added during ten minutes. After stirring the resulting mixture for two hours at —8°, 1.9 g. (0.050 mole) of sodium borohydride was added in small portions over a five-minute period. The reaction mixture was then stirred for twenty-five minutes without the cooling bath. The mixture was diluted with 125 ml. of water and the product was extracted with two 100 ml. portions of methylene chloride. The combined methylene chloride extracts were dried over anhydrous sodium sulfate, filtered and evaporated to dryness at reduced pressure to leave 6-phenylacetamidopenicillanyl alcohol as the residue. The product, 7.5 g. of brittle foam, was shown by its infrared and NMR spectra to be identical with the 6-phenylacetamido-penicillanyl alcohol obtained in Example 1.

In the present invention a penicillin alcohol is defined as a compound of the formula

in which R represents the side chain of any of the known penicillins other than those containing a group which is altered by reaction with sodium borohydride such as a ketonic carbonyl.

In the present invention a penicillin acid azide and a penicillin isocyanate are defined as a compound of the formula

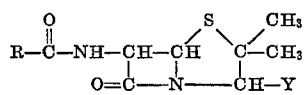

in which R represents the side chain of a known penicillin and Y is

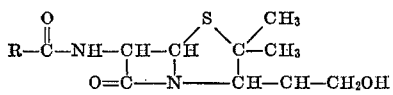

and —NCO respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of this invention.

We claim:
1. A member selected from the group consisting of a compound of the formula

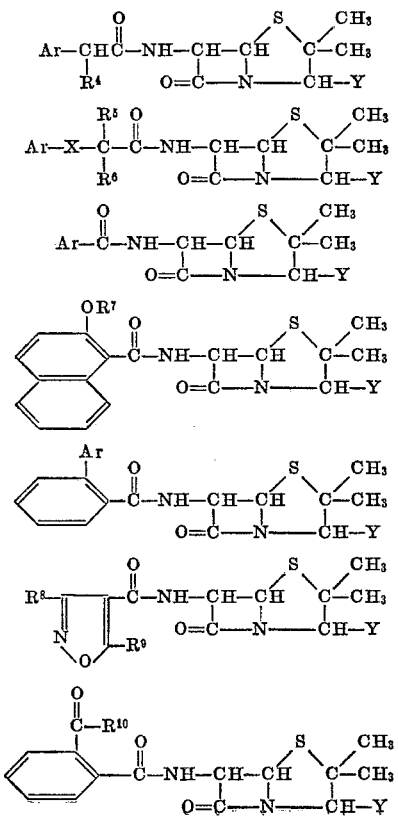

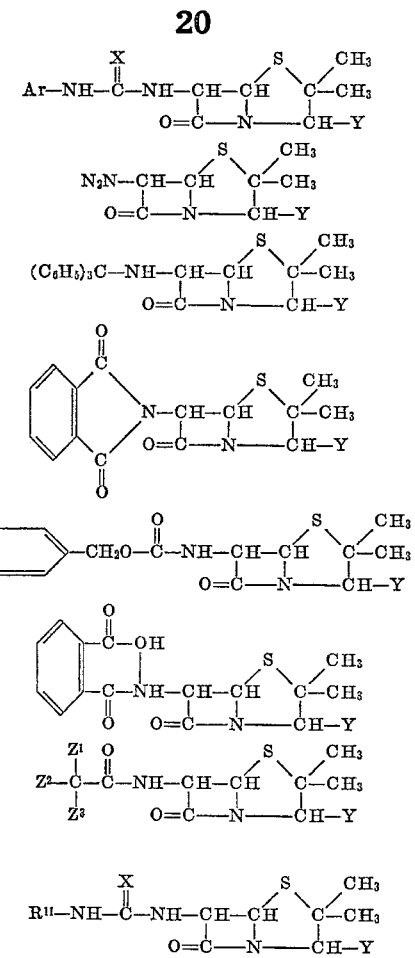

and wherein $R^4$ represents a member selected from the group consisting of hydrogen, amino, carbobenzoxyamino, phenyl, fluoro, chloro, bromo, iodo, hydroxy, (lower)alkanoyloxy and (lower)alkoxy;

X represents a member selected from the group consisting of oxygen and sulfur;

$R^5$ and $R^6$ each represent a member selected from the group consisting of hydrogen, phenyl, and (lower)alkyl;

$R^7$ represents (lower)alkyl;

$R^8$ and $R^9$ each represent a member selected from the group consisting of (lower)alkyl or Ar— and at least one of $R^8$ and $R^9$ represents (lower)alkyl;

$R^{10}$ represents a member selected from the group consisting of (lower)alkylamino, di(lower)alkylamino, cycloalkylamino having from 3 to 7 carbon atoms inclusive, allylamino, diallylamino, phenyl(lower)alkylamino, morpholino, lower(alkyl)morpholino, di(lower)alkylmorpholino, morpholino(lower)alkylamino, pyrrolidino, (lower)alkylpyrrolidino, di(lower)alkylpyrrolidino, N,N - hexamethyleneimino, piperidino, lower(alkyl)piperidino, di(lower)alkylpiperidino, 1,2,5,6-tetrahydropyridino, N - (lower)alkylpiperazino, N-phenylpiperazino, N-(lower)alkyl(lower)alkylpiperazino, N - (lower)alkyl-di-(lower)alkylpiperazino, furfurylamino, tetrahydrofurfurylamino, N-(lower)alkyl-N-furfurylamino, N-alkyl-N-anilino and (lower)alkoxyanilino; $Z^1$, $Z^2$ and $Z^3$ each represent a member selected from the group consisting of (lower)alkyl and the monovalent radical of the formula

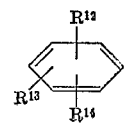

wherein $R^{12}$, $R^{13}$ and $R^{14}$ are each hydrogen, chloro, bromo, iodo, trifluoromethyl, nitro, (lower)alkyl or (lower)alkoxy;

$R^{11}$ represents a member selected from the group consisting of (lower)alkyl, (lower)cycloalkyl, naphthyl, benzyl and phenethyl;

and Ar— represents the monovalent radical of the formula

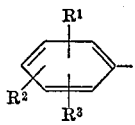

wherein $R^1$, $R^2$ and $R^3$ are each a member selected from the group consisting of hydrogen, chloro, bromo, iodo, trifluoromethyl, phenyl, (lower)alkyl and (lower)alkoxy, but only one R group may represent phenyl;

and Y is a monovalent radical selected from the group consisting of

and —NCO.

2. A member selected from the group consisting of compounds having the formulae

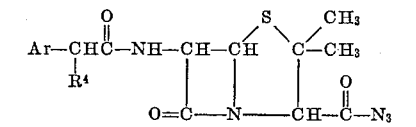

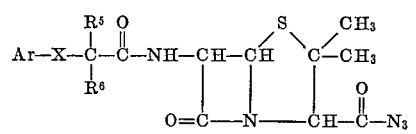

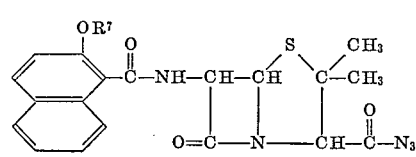

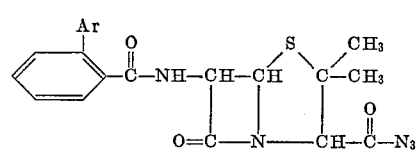

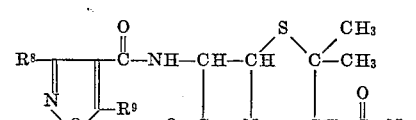

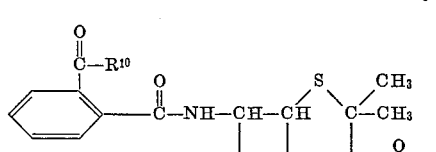

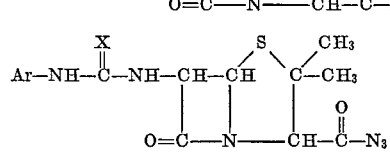

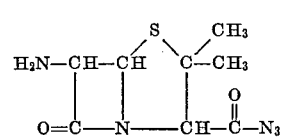

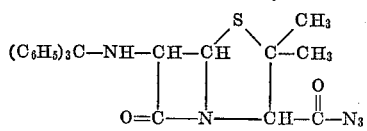

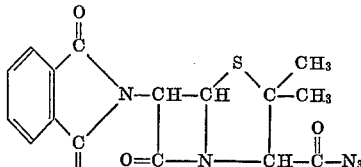

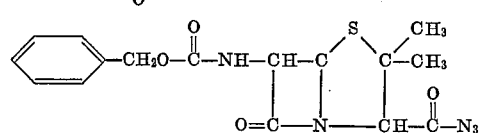

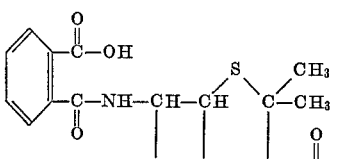

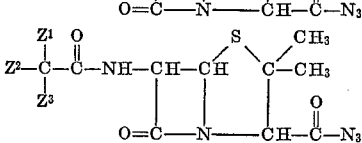

and

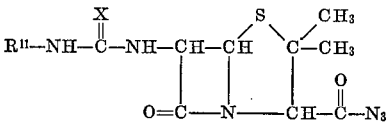

wherein $R^4$ represents a member selected from the group consisting of hydrogen, amino, carbobenzoxyamino, phenyl, fluro, chloro, bromo, iodo, hydroxy, (lower)alkanoyloxy and (lower)alkoxy; X represents a member selected from the group consisting of oxygen and sulfur; $R^5$ and $R^6$ each represent a member selected from the group consisting of hydrogen, phenyl and (lower)alkyl; $R^7$ represents (lower)alkyl; $R^8$ and $R^9$ each represents (lower)alkyl or Ar and at least one of $R^8$ and $R^9$ represents (lower)alkyl; $R^{10}$ represents a member selected from the group consisting of (lower)alkylamino, di-(lower)alkylamino, cycloalkylamino having from 3 to 7 carbon atoms inclusive, allylamino, diallylamino, phenyl(lower)alkylamino, morpholino, lower(alkyl)morpholino, di(lower)alkylmorpholino, morpholino-(lower)alkylamino, pyrrolidino, (lower)alkylpyrrolidino, di(lower)alkylpyrrolidino, N,N-hexamethyleneimino, piperidino, lower(alkyl)piperidino, di(lower)alkylpiperidino, 1,2,5,6-tetrahydropyridino, N-(lower)alkylpiperazino, N-phenylpiperazino, N-(lower)alkyl(lower)alkylpiperazino, N-(lower)alkyl-di-(lower)alkylpiperazino, furfurylamino, tetrahydrofurfurylamino, N-(lower)alkyl-N-furfurylamino, N-alkyl-N-anilino and (lower)alkoxyanilino; $Z^1$, $Z^2$ and $Z^3$ each represent a member selected from the group consisting of (lower)alkyl and the monovalent radical of the formula

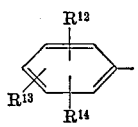

wherein $R^{12}$, $R^{13}$ and $R^{14}$ are each hydrogen, chloro, bromo, iodo, trifluoromethyl, nitro, (lower)alkyl or lower)alkoxy;

$R^{11}$ represents a member selected from the group consisting of (lower)alkyl, (lower)cycloalkyl, naphthyl, benzyl and phenethyl; and Ar— represents the monovalent radical of the formula

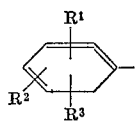

wherein $R^1$, $R^2$ and $R^3$ are each a member selected from the group consisting of hydrogen, chloro, bromo, iodo, trifluoromethyl, phenyl, (lower)alkyl and (lower)alkoxy, but only one R group may represent phenyl.

3. A compound of claim 1 having the formula

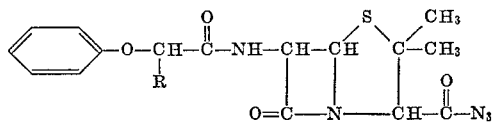

wherein R represents (lower)alkyl.

4. A compound of claim 1 having the formula

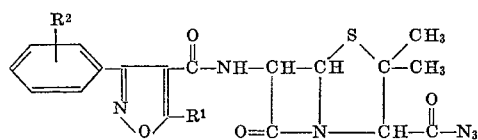

wherein $R^1$ represents (lower)alkyl and $R^2$ represents a member selected from the group consisting of hydrogen and chloro.

5. A compound of claim 1 having the formula

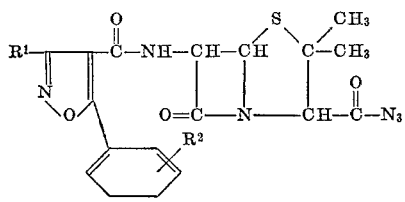

wherein $R^1$ is (lower)alkyl and $R^2$ is a member selected from the group consisting of hydrogen and chloro.

6. A compound of claim 1 having the formula

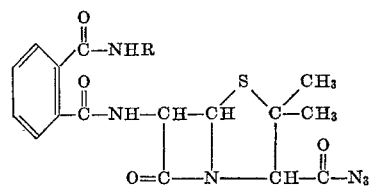

wherein R represents (lower)alkyl.

7. A compound of claim 1 having the formula

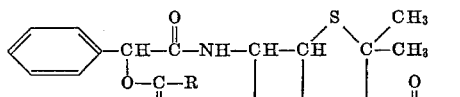

wherein R is (lower)alkyl.

8. A compound of claim 1 having the formula

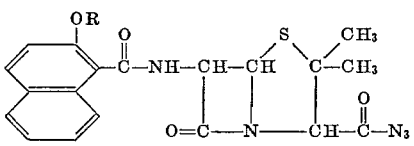

wherein R is (lower)alkyl.

9. A compound of claim 1 having the formula

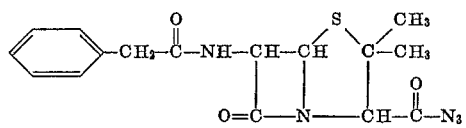

10. A compound of claim 1 having the formula

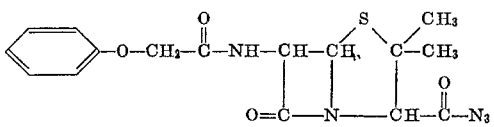

11. A compound of claim 1 having the formula

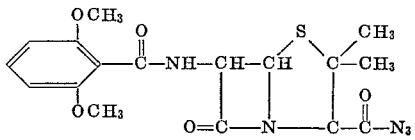

12. A compound of claim 1 having the formula

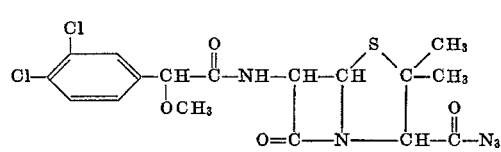

13. A compound of claim 1 having the formula

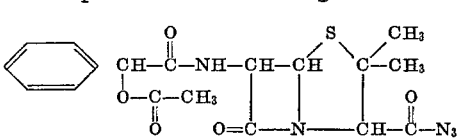

No references cited.

NICHOLAS S. RIZZO, *Primary Examiner.*

U.S. Cl. X.R.

424—271

PO-1050
(5/69)

UNITED STATES PATENT OFFICE
CERTIFICATE OF CORRECTION

Patent No. 3,454,556    Dated    July 8, 1969

Inventor(s) Lee C. Cheney and Yvon G. Perron

It is certified that error appears in the above-identified patent and that said Letters Patent are hereby corrected as shown below:

In the Claims: Claim 1, column 20, that portion of the formula between lines 5 and 8, reading:

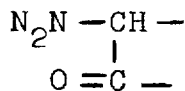  should read  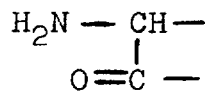 ; that portion of the formula between lines 24 and 28, reading:

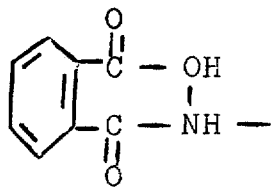  should read  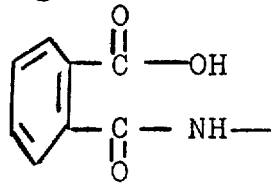.

In claim 13, column 24, lines 47 through 52, that portion of the formula which reads:

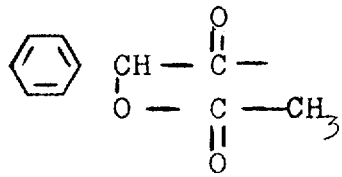  should read  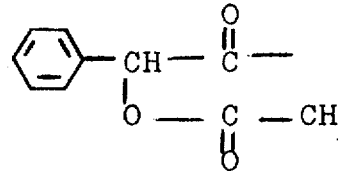

SIGNED AND
SEALED
MAR 24 1970

(SEAL)
Attest:

Edward M. Fletcher, Jr.
Attesting Officer

WILLIAM E. SCHUYLER, JR.
Commissioner of Patents